(12) United States Patent
Bultinck et al.

(10) Patent No.: US 10,532,297 B2
(45) Date of Patent: Jan. 14, 2020

(54) COALESCENCE FILTER AND METHOD FOR PURIFYING A FLUID

(71) Applicant: ATLAS COPCO AIRPOWER naamloze vennootschap, Wilrijk (BE)

(72) Inventors: Evi Bultinck, Borgerhout (BE); Isabelle De Wolf, Rumst (BE); Ken Goris, Oud-Turnhout (BE); Jo Wouters, Westerlo (BE); Gerhard Kasper, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 145 days.

(21) Appl. No.: 14/554,727

(22) Filed: Nov. 26, 2014

(65) Prior Publication Data

US 2015/0182878 A1 Jul. 2, 2015

Related U.S. Application Data

(60) Provisional application No. 61/909,431, filed on Nov. 27, 2013.

(30) Foreign Application Priority Data

Sep. 8, 2014 (BE) .................................. 2014/0669

(51) Int. Cl.
*B01D 17/04* (2006.01)
*C02F 1/40* (2006.01)
(Continued)

(52) U.S. Cl.
CPC ......... *B01D 17/045* (2013.01); *B01D 46/003* (2013.01); *B01D 46/0023* (2013.01);
(Continued)

(58) Field of Classification Search
None
See application file for complete search history.

(56) References Cited

U.S. PATENT DOCUMENTS 3,893,925 A * 7/1975 Jones ................. B01D 17/0202
210/266
4,102,785 A 7/1978 Head et al.
(Continued)

FOREIGN PATENT DOCUMENTS

WO 2007133403 A2 11/2007

OTHER PUBLICATIONS

National Filter Media, "Conversion Factors for Air Permeability", Nov. 23, 2011, https://web.archive.org/web/20111123232229/http://www.nfm-filter.com/nationalfilter/userfiles/file/Conversion%20Factors%20for%20Air%20Permeability.pdf (Year: 2011).*
(Continued)

*Primary Examiner* — Amber R Orlando
*Assistant Examiner* — Brit E. Anbacht
(74) *Attorney, Agent, or Firm* — Bacon & Thomas, PLLC (57) ABSTRACT

The present invention relates to a coalescence filter for purifying a fluid which contains a carrier and at least one liquid contaminant, by coalescing of the at least one contaminant. The coalescence filter comprises an inlet for supplying the fluid to a filter element present in the coalescence filter. The filter element comprises a primary coalescence medium which is provided for coalescing of the at least one contaminant in the primary coalescence medium. The coalescence filter further comprises an outlet for discharging the coalesced contaminant from the filter element. The primary coalescence medium comprises at least one layer of a porous material, and has a total thickness of at least 3.5 mm, preferably at least 4 mm, preferably at least 5 mm, more preferably at least 6 mm, most preferably at least
(Continued)

7 mm, in particular at least 7.5 mm, measured at a pressure of $2N/cm^2$.

20 Claims, 4 Drawing Sheets

(51) Int. Cl.
  *B01D 46/00*  (2006.01)
  *B01D 46/40*  (2006.01)
  *B01D 53/26*  (2006.01)
  *F04B 53/20*  (2006.01)
  *C02F 1/00*  (2006.01)
  *C10G 31/09*  (2006.01)
  *C02F 101/32*  (2006.01)

(52) U.S. Cl.
  CPC ......... *B01D 46/403* (2013.01); *B01D 53/265* (2013.01); *B01D 53/268* (2013.01); *C02F 1/001* (2013.01); *C02F 1/40* (2013.01); *C10G 31/09* (2013.01); *F04B 53/20* (2013.01); *B01D 2239/0421* (2013.01); *B01D 2239/0428* (2013.01); *B01D 2239/065* (2013.01); *B01D 2239/1216* (2013.01); *B01D 2239/1233* (2013.01); *B01D 2239/1258* (2013.01); *B01D 2239/1291* (2013.01); *C02F 2101/32* (2013.01); *C10G 2300/201* (2013.01)

(56) References Cited

U.S. PATENT DOCUMENTS

| | | | | |
|---|---|---|---|---|
| 4,253,954 A | * | 3/1981 | Midkiff | B01D 17/045 |
| | | | | 210/315 |
| 4,877,527 A | | 10/1989 | Brownell | |
| 4,995,974 A | * | 2/1991 | Lorey | B01D 17/045 |
| | | | | 210/247 |
| 5,702,603 A | * | 12/1997 | Johnson | B01D 29/213 |
| | | | | 156/218 |
| 5,728,298 A | | 3/1998 | Hamlin | |
| 5,908,558 A | * | 6/1999 | Holland | B01D 15/00 |
| | | | | 210/266 |
| 5,961,678 A | | 10/1999 | Pruette et al. | |
| 7,985,344 B2 | * | 7/2011 | Dema | B01D 27/06 |
| | | | | 210/504 |
| 8,114,183 B2 | | 2/2012 | Schwandt et al. | |
| 8,167,980 B2 | | 5/2012 | Hiner et al. | |
| 8,409,448 B2 | | 4/2013 | Chase et al. | |
| 8,950,587 B2 | * | 2/2015 | Thomson | B01D 39/1623 |
| | | | | 210/490 |
| 9,149,748 B2 | * | 10/2015 | Nagy | B01D 39/18 |
| 10,058,808 B2 | * | 8/2018 | Haberkamp | B01D 39/163 |
| 2004/0134171 A1 | * | 7/2004 | Scott | B01D 46/0001 |
| | | | | 55/482 |
| 2007/0062887 A1 | * | 3/2007 | Schwandt | B01D 17/045 |
| | | | | 210/799 |
| 2013/0340613 A1 | * | 12/2013 | Krupnikov | B01D 53/0407 |
| | | | | 95/90 |
| 2015/0101298 A1 | * | 4/2015 | Osendorf | B01D 46/2414 |
| | | | | 55/502 |

OTHER PUBLICATIONS

D. Kampa et al., "Pressure drop and liquid transport through coalescence filter media used for oil mist filtration", International Journal of Multiphase Flow, 58, 2014, pp. 313-324.

* cited by examiner

COALESCENCE FILTER AND METHOD FOR PURIFYING A FLUID

BACKGROUND OF THE INVENTION

This invention relates to a coalescence filter for purifying a fluid which contains a carrier and at least one liquid contaminant by coalescing of the at least one contaminant, wherein the coalescence filter includes an inlet for supplying the fluid to a filter element present in the coalescence filter, wherein the filter element includes a primary coalescence medium which is provided for coalescing of the at least one contaminant in the primary coalescence medium during the displacement of the fluid through the primary coalescence medium, wherein the coalescence filter further includes an outlet for discharging the coalesced contaminant from the filter element, wherein the primary coalescence medium comprises at least one layer of a porous material.

The use of coalescence filters for coalescing a dispersed phase from a mixture of two immiscible phases, a continuous and a dispersed phase, is known per se. Examples of practical applications include separating oil aerosol droplets from compressed air coming from air compressors and crankcases, separating water as a dispersed phase from fuel as a continuous phase in fuel-water systems, or separating oil as a dispersed phase from a water-oil system with water as a continuous phase.

Coalescence is induced by a coalescence medium, which typically comprises a plurality of layers of one or more porous, fibrous substrates, which may be wettable (oleophilic or fluid-attracting or adsorbent) or non-wettable (oleophobic or fluid-repellent). The fibrous material has a surface that induces aggregation or coalescence of the dispersed phase. A disperse fluid with droplets of a dispersed phase is moved by the continuous phase or carrier of the fluid through the coalescence medium, for example, oil-contaminated air. The dispersed phase often coalesces already in the first layers on the fibers of the coalescence medium. Upon continuous supply of fluid, the droplets grow into larger drops. The drops are transported with the air flow through the filter, and as soon as they reach a size that does not adhere to the fibers of the coalescence medium anymore, they exit the filter, typically under the influence of gravitation. After being in use for some time, the filter usually reaches a steady state condition, where the rate of accumulation of the dispersed phase of fluid drops in the coalescence medium corresponds to the rate of drainage from the filter. Coalesced drops typically have a drop diameter of 5 to 500 μm.

For manufacturing coalescence filters, diverse kinds of materials are used, for instance, organic and inorganic fibrous or porous materials. These materials are available in diverse forms, for instance, as homogeneous, heterogeneous, layered or pleated or rolled materials, composites, laminates and combinations thereof. Forms suitable for use as coalescence filter are typically a web, cloth, cylinder, cube or other simple or complex geometric shape. The separating capacity of a filter material depends on numerous parameters including the composition and orientation of the fibers in the filter or coalescence medium, the yield of the filter material under the practical conditions, the concentration of the contaminants (dispersed phase) in the carrier (continuous phase), the pressure to which the filter material is subjected, and the volume of continuous phase to which the filter is exposed over time.

Numerous attempts were undertaken to improve the separating power of a coalescence filter unit, inter alia by the use of complex fiber structures or porous structures in the coalescence medium.

U.S. Pat. No. 8,167,980 describes a three stage filter whereby a first layer is a material targeting coalescing and particulate capture and a second water tight stage is used to coalesce re-entrained droplets released from the first stage, and third stage filter acts upon re-entrained droplets from the second stage.

U.S. Pat. No. 4,102,785 utilizes an open scrim spirally wound and interposed between layers of glass fiber to obtain a material with a burst strength of fifty-two pounds per square inch or better so as to maintain function structure when exposed to fluidic flow.

U.S. Pat. No. 4,877,527 describes a liquid filter using a lamination of surface type filtering medium and an interposed layer of depth type media, wherein the surface type medium further includes sections of greater and lesser porosity.

U.S. Pat. No. 5,961,678 includes a laminate construct for coalescing type filters wherein a layer of filtering medium is adjacent to a filter drainage layer and a transport layer in which fibers having a grooved profile conducive to capillary action of coalesced contaminants.

U.S. Pat. No. 5,728,298 describes a filter element having a porous integral self-supporting filter interposed between an inner shell having a large pore size and an outer shell having a small pore size.

U.S. Pat. No. 8,114,183 describes a coalescence filter for separating an immiscible continuous and dispersed phase. The coalescence filter includes an axially extending coalescence element with a coalescence medium comprising a plurality of fibers oriented in gravitational direction. As a result of the fibers of the coalescence medium extending tangentially along the perimeter of the coalescence element, the flow resistance is reduced and drainage to the exit at the bottom is promoted. The coalescence element has a cross section in a direction transverse to its axis in the form of a closed loop with an inner cavity. To realize a highest possible drainage pressure, the vertical dimension is as great as possible and the transverse dimensions of the coalescence element decrease towards the bottom. U.S. Pat. No. 8,114,183 further describes having the average fiber diameter and/or the porosity of the coalescence element decrease towards the center of the coalescence element, with a view to capturing contaminants of larger dimensions, which may cause occlusion of the coalescence element, in the initial, open, less restrictive layers.

From U.S. Pat. No. 8,409,448 it is known for a coalescence filter for removing an immiscible lipophilic or hydrophilic liquid, respectively, from a continuous hydrophilic or lipophilic liquid phase, respectively, to be built up from a blend of fibers having varying hydrophobic and hydrophilic surface properties. Coalescence and wetting can be controlled by controlling the amount of hydrophobic and hydrophilic fibers.

The prior art coalescence filters, however, exhibit the disadvantage that the pressure drop across the filter is often still too great, in other words, that a great pressure decrease occurs across the filter, which adversely affects the filter performance. A known measure for reducing the pressure drop is to take away or reduce the number of layers of filter material. This, however, has an adverse effect on the filter efficiency. Filter efficiency refers to the amount of fluid that is filtered by the coalescence filter relative to the amount of fluid at the inlet of the filter.

SUMMARY OF THE INVENTION

There is thus a need for a coalescence filter that exhibits a highest possible filter efficiency in use.

This invention therefore contemplates the provision of a coalescence filter having an improved filter efficiency.

This is achieved according to the invention with a coalescence filter that has the technical features of the primary coalescence medium comprising a total thickness of at least 3.5 mm, preferably at least 4 mm, preferably at least 5 mm, more preferably at least 6 mm, most preferably at least 7 mm, in particular at least 7.5 mm, measured at a pressure of $2N/cm^2$.

Accordingly, the coalescence filter of this invention is characterized in that the primary coalescence medium has a total thickness of at least 3.5 mm, preferably at least 4 mm, preferably at least 5 mm, more preferably at least 6 mm, most preferably at least 7 mm, in particular at least 7.5 mm, measured in the flow direction of the fluid to be coalesced, at a pressure of $2N/cm^2$. Within the purview of this invention, "total thickness" is understood to mean that the thickness of the primary coalescence medium is measured in the direction in which the fluid flows through the coalescence filter and hence the coalescence medium, while the primary coalescence medium is subjected to an ambient pressure of $2N/cm^2$.

The great layer thickness of the primary coalescence medium according to this invention in comparison with the prior art coalescence filters makes it possible to improve the filter efficiency. The great layer thickness enables in particular a considerable increase of the coalescence yield, i.e., the amount of contaminant that is filtered by the primary coalescence medium or is coalesced in the primary coalescence medium, relative to the amount of contaminant at the inlet of the filter.

The inventors have found in addition that in the coalescence medium of this invention, the capillary pressure is hardly influenced by the greater layer thickness of the primary coalescence medium, and that also the resistance to be overcome by the fluid during its displacement through the primary coalescence medium (the so-called channel pressure) remains limited and is small compared to the capillary pressure. This is surprising since it is customary in the prior art, for the purpose of increasing filter efficiency, to limit or lower the layer thickness of the coalescence filter, for instance by using a limited number of layers of porous material, in order to keep the pressure drop across the filter low. This invention now makes it possible not only to improve the filter efficiency, but also to reduce the pressure drop across the coalescence filter, and thus to improve filter performance.

For the purpose of practical usefulness in existing filter devices and in view of costs, the primary coalescence medium preferably has a total thickness of 50 mm at a maximum, preferably 40 mm at a maximum, more preferably 30 mm at a maximum, most preferably 25 mm at a maximum, in particular 20 mm at a maximum. In fact, the inventors have found that the filter efficiency is not significantly improved at a greater thickness of the primary coalescence medium and that the material cost tends to become disproportionately high then. With increasing thickness, moreover, there is a risk that the pressure to be overcome by the coalesced contaminant to move through the primary coalescence medium, the so-called channel pressure, becomes too high. In fact, the inventors have found that once coalescence of the contaminant into larger drops has occurred, transport through the primary coalescence medium takes place under the influence of the transport of the carrier present in the fluid through the coalescence medium. It appeared then that the pressure to be overcome to transport the coalesced drops through the primary coalescence medium, in the form of channels extending throughout the thickness of the coalescence medium, depends on the thickness of the primary coalescence medium.

The primary coalescence medium of this invention can be simply manufactured, for instance, by processing a fibrous material, for instance glass fibers, in such a way that a layer-form or sheet-form material is provided having pores or openings between the fibers. The pores in the fibrous material of the coalescence medium through which the fluid moves and in which coalescence takes place are substantially formed by the spaces that are present between the fibers of the fibrous material. Suitable techniques that make this possible are known to the skilled person and comprise inter alia manufacturing one or more sheets, for instance, woven or nonwoven fibrous materials, knitted materials, braided fibers, films, scrims, and combinations of the aforementioned materials or laminates or composites thereof. Fibrous materials suitable for use in a primary coalescence medium of this invention are known to the skilled person, and are preferably so chosen as to be able to effect the capture and coalescence of the contaminant in the coalescence medium. However, other porous materials may also be suitably used as primary coalescence medium.

The primary coalescence medium is preferably a porous material having pores of an average diameter of between 2 and 100 µm, preferably between 3 and 70 µm, more preferably between 5 and 50 µm, in particular between 5 and 35 µm, more particularly between 5 and 30 µm.

A primary coalescence medium whose porosity is provided by pores as described above, has an open structure.

A primary coalescence medium manufactured from a fibrous material will mostly substantially contain fibers having an average diameter of 0.25-20 µm, preferably 0.5-10 µm, although fibers of a still smaller or greater diameter may be present. Mostly, the primary coalescence medium will be made up of a multiplicity of fibers whose diameter varies within the aforementioned limits.

The primary coalescence medium of this invention preferably has an air permeability of at least 30 $l/m^2 \cdot s$, preferably at least 50 $l/m^2 \cdot s$, more preferably at least 60 $l/m^2 \cdot s$, most preferably at least 80 $l/m^2 \cdot s$, in particular at least 100 $l/m^2 \cdot s$ or more. The air permeability can vary within wide limits and in practice will typically not be higher than 2,000 $l/m^2 \cdot s$, preferably 1,750 $l/m^2 \cdot s$ at a maximum. The air permeability is measured at 2 mbar according to DIN EN ISO 9237.

A primary coalescence medium with such an air permeability has an open structure.

According to the invention, it is thus possible to obtain a primary coalescence medium having an improved performance, which is able to provide a better separation yield of the contaminant present in the fluid, by making use of a primary coalescence medium having a greater total thickness in combination with a more open structure, than known heretofore.

The open structure contributes to enabling a considerable increase of the coalescence yield, i.e., the amount of contaminant that is filtered by the primary coalescence medium or is coalesced in the primary coalescence medium, relative to the amount of contaminant at the inlet of the filter. This is in contrast to the prior art, which teaches, for the purpose of increasing filter efficiency, the use of a primary coalescence medium of a lesser thickness, in which the pores have a smaller mean diameter.

The inventors have further found that in the use of a primary coalescence medium with an open structure as described above, also the capillary pressure to be overcome by a coalescing fluid upon flowing into the pores of a non-wetting primary coalescence medium (for instance, an oil repellent or oleophilic coalescence medium) can be reduced considerably, as well as the capillary pressure to be overcome by the coalesced liquid upon exiting a wetting primary coalescence medium (for instance, an oil adsorbing or oleophilic coalescence medium). This lower capillary pressure provides the advantage that the primary coalescence medium can have a much greater thickness and a more open structure than was considered possible heretofore, so that the coalescence yield can be raised considerably, and that nonetheless the pressure drop across the coalescence filter can be kept sufficiently low. The thickness is measured in the flow direction of the fluid to be coalesced. In practice, this can mean that the primary coalescence medium can be made up of a much greater number of layers of filter material than was customary hitherto, and that at the same time the pressure drop across the coalescence filter can be kept sufficiently low.

The inventors have actually established that in the use of a primary coalescence medium having smaller pores and hence a more closed structure, the pressure drop across the coalescence medium proves to be considerably higher. Consequently, in the use of a coalescence medium having smaller pores, it is necessary to keep the thickness low to ensure a sufficiently low pressure drop across the coalescence filter.

A reduced capillary pressure further provides the advantage that the energy needed for supplying a contaminant into the pore system of a non-wetting primary coalescence medium can be reduced, as well as the capillary pressure to be overcome upon a contaminant exiting a wetting primary coalescence medium. A non-wetting primary coalescence medium is understood to mean that the coalescence medium exhibits a low affinity for the coalescing liquid, or, in other words, that substantially repulsive forces occur between the two materials. Examples of a non-wetting primary coalescence medium include an oleophobic and/or hydrophobic primary coalescence medium. A wetting primary coalescence medium is understood to mean that the primary coalescence medium exhibits a high affinity for the coalescing liquid or, in other words, that substantial forces of attraction occur between the primary coalescence medium and the coalescing liquid. Examples of a wetting primary coalescence medium include an oleophilic and/or hydrophilic primary coalescence medium.

The skilled person is able to tailor the thickness of the primary coalescence medium, taking into account the nature of the primary coalescence medium, particularly taking into account the mean size of the pores of the coalescence medium and/or the air permeability and/or density of the coalescence medium, so as to enable the intended performance.

The primary coalescence medium may be made up of a plurality of closely stacked or closely wrapped adjacent layers of a sheet-form porous filter material, although the use of a single layer having a desired thickness is also possible. Closely stacked is understood to mean that successive layers are in contact with each other or, in other words, that successive layers are arranged adjacently. Adjacent layers of sheet-form coalescence medium are preferably stacked such, or a sheet of the coalescence medium is wrapped such, that successive layers of the coalescence medium are arranged adjacently, that the distance between successive layers is minimal, and that any layer of air present between successive layers has a minimal thickness or, preferably, is even absent. This makes it possible for the capillary pressure that is to be overcome upon transition of the fluid from one layer to the other, to be kept as low as possible. This also makes it possible to minimize the risk of the fluid flowing out between successive layers.

In an embodiment, successive layers of the primary coalescence medium may be made up of a same porous material. By stacking layers of the same material, it is possible to prevent an additional capillary pressure needing to be overcome when the fluid from a previous layer enters a next layer, and it is consequently possible to minimize the risk of increase of the pressure drop across the coalescence filter as a result of material transitions. In another embodiment, two or more successive layers of the primary coalescence medium are made up of different materials, in particular, materials having a different average porosity and/or a different average pore diameter and/or a different density and/or a different air permeability. It is also possible to build up the primary coalescence medium from a first primary coalescence medium and a second primary coalescence medium, the first primary coalescence medium being made up of one or more layers of a first material, for instance a wetting, oleophilic or hydrophilic coalescence medium, and the second coalescence medium being made up of one or more layers of a second material, for instance, a non-wetting, oleophobic or hydrophobic coalescence medium.

In case the primary coalescence medium is made up of a plurality of layers, the layer thickness of the individual layers may vary within wide limits. The layer thickness of the individual layers of the primary coalescence medium may vary, for instance, from 0.1 to 1 mm, preferably 0.4 mm, more preferably 0.5 mm, most preferably 0.6 mm. The skilled person is able to select the desired layer thickness taking into account the total layer thickness intended for the coalescence medium.

The primary coalescence medium of this invention includes preferably at least 4 successive layers of a same porous material to guarantee a sufficient degree of coalescence, more preferably at least 6 layers, most preferably at least 10 layers. The number of layers will generally not be more than 30, since the filter efficiency is not significantly improved if the primary coalescence medium includes more layers, and the material cost then tends to become disproportionally high. A further increase of the number of layers moreover entails a risk of the channel pressure becoming too high, as has been explained hereinabove. Preferably, the number of layers of material from which the primary coalescence medium is built up is not more than 25, most preferably not more than 20.

The inventors have further found that during fluid flow through a multilayer primary coalescence medium as described above, the contaminant present in the fluid coalesces in the pores or openings present in the primary coalescence medium. The pores of successive layers seem to form quasi-continuous channels extending in the flow direction of the fluid, through the coalescence medium, and provide preferred pathways along which the fluid moves.

Without wishing to be bound by this theory, the inventors believe that the pores of successive material layers which the primary coalescence medium is comprised of, overlap at least partly, so that pores from a previous layer link up at least partly with, and in that way provide access to, pores in a next layer. Thus, a kind of channels or preferred pathways are formed which extend through several layers of the primary coalescence medium, through which the fluid moves. Preferred pathways in successive layers will mostly not be perfectly congruent. Rather, preferred pathways will partly, to a greater or lesser extent, but sometimes also wholly, link up with each other, and in that way form quasi-continuous channels in which the contaminant can deposit. These quasi-continuous channels extend throughout the thickness of the material of the primary coalescence medium, in the flow direction of the fluid. The inventors further believe that these quasi-continuous channels in the primary coalescence medium exhibit a higher permeability to the fluid than the surrounding material does, or, in other words, form channels having a higher flow capacity for the fluid.

The inventors have further found that the above-described quasi-continuous channels in successive layers are located in the primary coalescence medium in each other's proximity, laterally. Without wishing to be bound by this theory, the inventors believe that a contaminant present in a layer of the coalescence medium spreads laterally to some extent and locally forms a spot or, in other words, a local continuous phase. Supposedly, the contaminant moves along preferred pathways where the least resistance is to be overcome. Thus, the coalesced contaminant forms a continuous phase, which extends both laterally in the coalescence medium and in the depth or flow direction of the fluid. The afore-described process repeats itself in the thickness direction and/or in successive layers of the primary coalescence medium.

The assumption that preferred pathways are present in the layered structure of the coalescence medium of this invention is plausible. Porous filter materials, in particular sheet-form filter materials made up of fibrous materials, even if carefully manufactured, exhibit areas that on a microscale are not homogeneous and exhibit a locally varying permeability with openings between the fibers. Air or any other fluid will preferentially move though areas of higher/better permeability. In these areas of better permeability, a contaminant will first precipitate in the pores and coalesce into larger drops. These drops are moved with the air flow through areas of better permeability. As a result of the high permeability areas in successive layers aligning with each other at least partly, quasi-continuous channels form.

Within the purview of this invention, consequently, "channels" is understood to refer to the use of a preferred pathway by an amount of coalescing liquid periodically moved through the primary coalescence medium under the influence of the flow of the fluid, for instance air. These pathways have a random shape and can extend in all directions. According to the invention, "channels" does not necessarily refer to cylinder-shaped tubes or conduits. With non-wetting coalescence media these channels give rise to the formation of drops at the exit of the filter; with wetting coalescence media these channels spread in the last layer into a film, which has to be pushed out of the primary coalescence medium under the influence of capillary force and thus leads to capillary pressure drop.

In a preferred embodiment of this invention, the primary coalescence medium has a density in the range of from 0.05 to 0.90 g/cm$^3$, preferably from 0.05 to 0.75 g/cm$^3$, more preferably from 0.08 to 0.50 g/cm$^3$. The density is measured by weighing an amount of material of the primary coalescence medium having an area of 1 m$^2$, and multiplying this by the thickness of this material, measured with a digital micrometer at a pressure of 2N/cm$^2$.

The coalescence filter of this invention preferably includes, adjacent to a surface of the primary coalescence medium, a drainage layer, preferably along a downstream surface of the primary coalescence medium along which coalesced contaminant exits the primary coalescence medium, for taking up and draining coalesced contaminant and promoting the discharge thereof. This drainage layer positioned downstream is also intended to provide a barrier to resist reflux of coalesced contaminant back to the coalescence medium and/or, in particular, to the carrier present in the fluid. Without wishing to be bound by this hypothesis, it is supposed that the drainage layer forms a boundary or transitional zone along the boundary surface of the primary coalescence medium along which draining occurs, so that build-up of contaminant at the boundary surface is counteracted, by formation of large drops which are driven by the motive force of gravitation and are deposited in the housing of the filter for discharge from the filter. Also, if desired, upstream of the primary coalescence medium a protective layer may be arranged, adjacent to a surface of the primary coalescence medium along which fluid is supplied to the primary coalescence medium, in a manner such that the two materials are in contact. Downstream, also a protective layer may be added, adjacent to a surface of the primary coalescence medium, which, in addition to a protective action, can also have an extra drainage function.

The invention also relates to a coalescence medium as described above as part of and/or for use in a coalescence filter as described above.

The invention further relates to a method for purifying a fluid which contains a carrier and at least one contaminant, wherein the fluid is conducted through a coalescence filter as described above, for reducing the concentration of the at least one contaminant by coalescing the at least one contaminant in the coalescence filter, in particular in the primary coalescence medium. The fluid may then be chosen, for instance, from the group of compressed air contaminated with one or more hydrocarbons, contaminated water or contaminated hydrocarbons, but other fluids can likewise be suitably used. The coalescence filter of this invention is suitable for use in a continuous process in which a continuous supply of fluid to the primary coalescence medium takes place. It is also possible, however, to supply the fluid in one or more discrete batches.

The invention furthermore relates to the use of the coalescence filter described in this patent application for separating one or more liquid contaminants from a carrier, wherein the carrier can be a gas or a liquid. The invention relates in particular to the use of the coalescence filter described in this patent application for separating oil aerosol drops from compressed air coming from air compressors and crankcases, separating water as a dispersed phase from fuel as a continuous phase in fuel-water systems, or separating oil as a dispersed phase from a water-oil system with water as a continuous phase.

BRIEF DESCRIPTION OF THE DRAWINGS

The invention is further elucidated below in the appended figures and the description of these figures. It should be understood that such drawings are for descriptive purposes only and are therefore not limiting for the shape and/or dimensions of the invention.

DETAILED DESCRIPTION OF THE INVENTION

Figure 1:
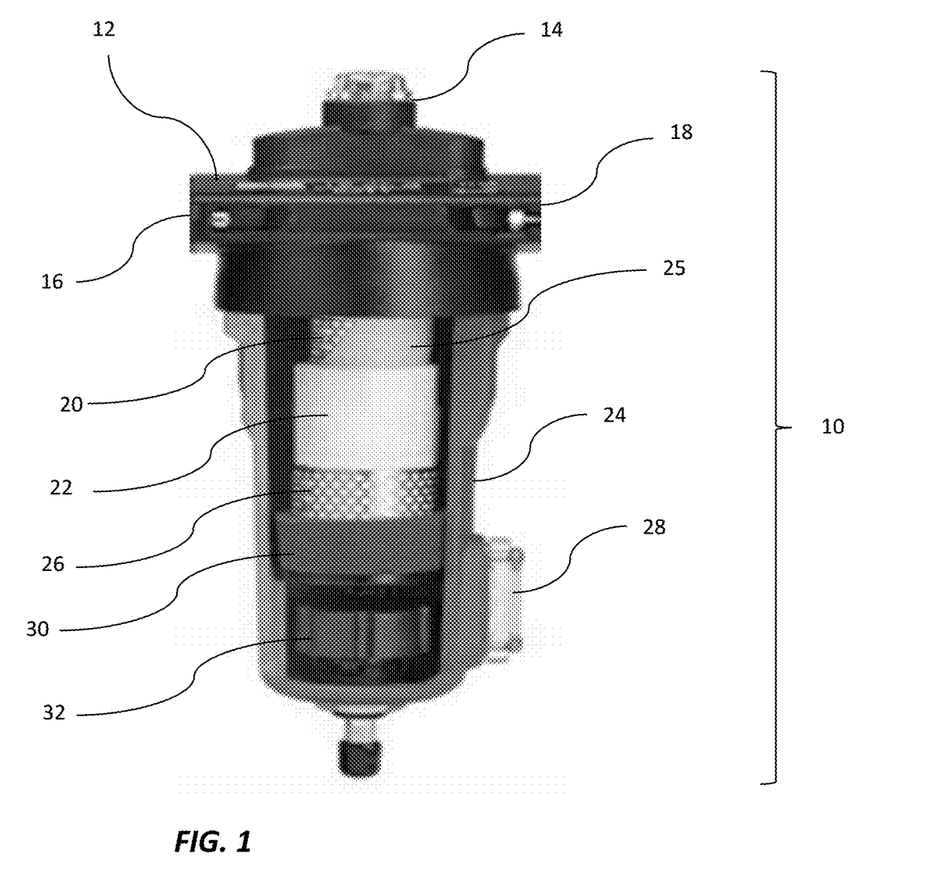
FIG. 1 shows a view of the inner volume of a representative coalescence filter for compressed gas.

The coalescence filter 10 shown in FIG. 1 includes a closed housing 24 with a filter head 12 at the top. Filter head 12 includes an inlet 16 via which a fluid containing a carrier liquid and at least one contaminant is introduced into the coalescence filter. The housing 24 includes an outlet 18 for discharging a fluid and/or carrier liquid which has flowed through the filter element. Filter head 12 is detachably connected with housing 24, so that the inner space of the coalescence filter is accessible for replacement of the filter element if necessary. The detachable connection can be effected in any manner considered suitable by the skilled person, for instance, by means of a threaded connection, by means of pressure, friction, clamping, etc. Inlet 16 is connected with a filter element in such a manner that a fluid can be passed to the filter element. The filter element is preferably detachably connected with the filter head 12, so that the filter element can be replaced periodically, or can be replaced if necessary.

The coalescence filter shown in FIG. 1 is intended for coalescing one or more liquid contaminants present in a liquid or gaseous carrier of a fluid. The one or more contaminants can be, for instance, an inert or reactive substance. The one or more contaminants may, for instance, belong to the group of liquids, aerosols, macrodrops or mixtures of two or more of these materials. An example of a fluid suitable for use with the coalescence filter of this invention is compressed air, contaminated with an oil aerosol.

The filter element includes at least one primary coalescence medium 22, for coalescing in the coalescence medium one or more liquid contaminants present in the fluid and separating these contaminants from a carrier present in the fluid. Depending on the intended application, especially if coalescence of a plurality of contaminants is intended, it may be chosen to install two or more different primary coalescence media, each with a desired affinity for the contaminant to be removed.

Figure 2A:
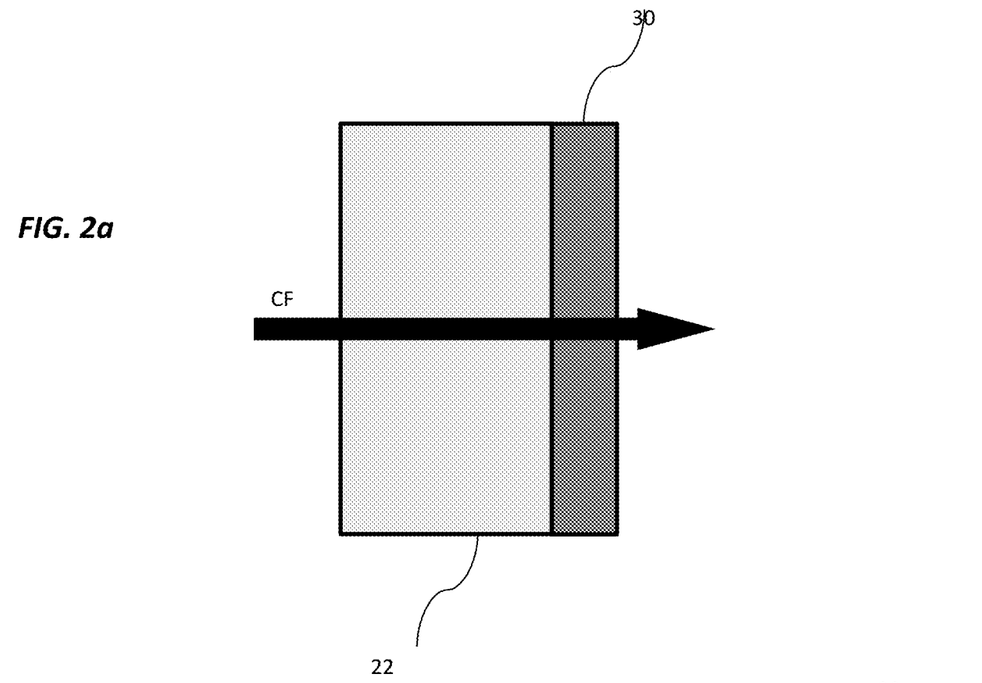
FIG. 2a is a schematic cross section of a primary coalescence medium, relative to a drainage layer, with a carrier fluid (CF) being supplied at an angle of 90° and the coalescence medium and the drainage layer arranged adjacently.
Figure 2B:
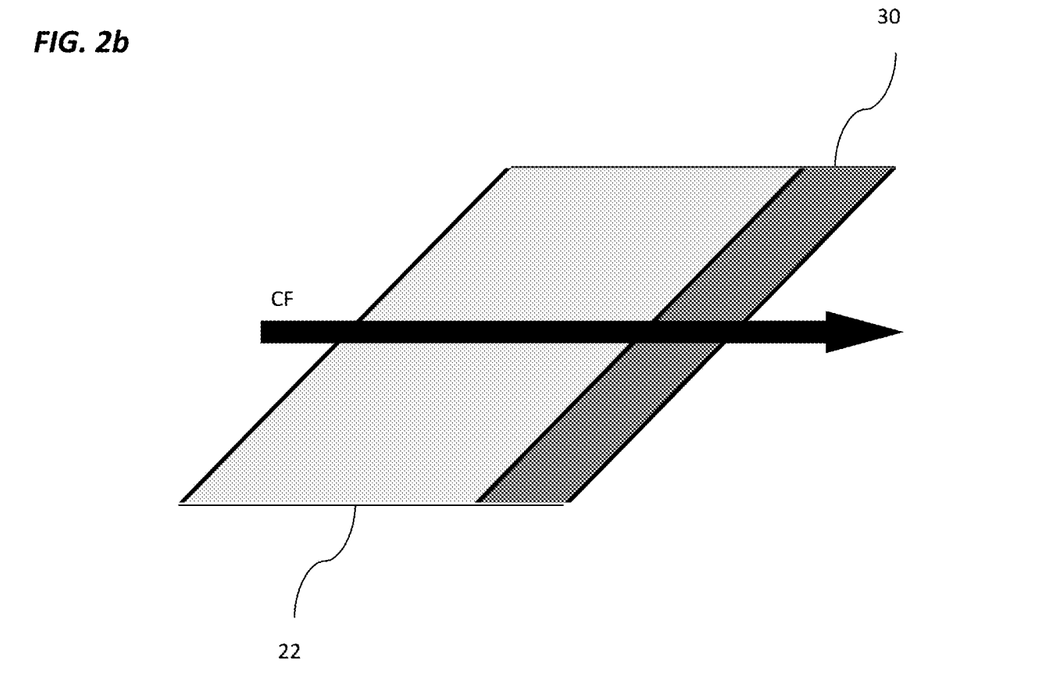
FIG. 2b is a schematic representation of a primary coalescence medium, relative to a drainage layer, with a carrier fluid (CF) being supplied at an angle of between 1° and 90° and the coalescence medium and the drainage layer arranged adjacently.

In a preferred embodiment, the filter element additionally includes, adjacent to the coalescence medium 22 and downstream from the coalescence medium 22, at least one porous drainage layer 30. This drainage layer is positioned adjacent to a surface of the coalescence medium, with or without a layer of air or other physical separation between the two media, preferably without a layer of air. Purpose is to enable an energy-efficient flow of fluid, carrier and/or contaminant from the coalescence medium to the drainage layer. This is shown in FIGS. 2a and 2b. The drainage layer is mostly arranged downstream of the primary coalescence medium.

A drainage layer 30 positioned downstream is intended to maximize the transfer and delivery/discharge of the contaminant separated from the fluid by the primary coalescence medium due to the motive force of the fluid and/or the carrier present therein which is conveyed through the filter, on the one hand. Materials that enable this are known to the skilled person. The material of the drainage layer 30 preferably also provides a barrier to resist reflux of the coalesced contaminant back to the primary coalescence medium 22 but, in particular, to the carrier. Without wishing to be bound by this, it is supposed that the drainage layer 30 provides a boundary or transitional zone for the adjacent surface of the coalescence medium 22, which counteracts any build-up of coalesced contaminant on this contact surface in that it stimulates the formation of macroscopic drops of the contaminant liquid. These drops are thereupon driven off the drainage layer 30 by an additional motive force, such as gravity, and, for instance, deposited or precipitated in the housing and discharged from the filter. If desired, two or more drainage layers 30 may be provided. An example of a suitable material is an open cell polymeric foam.

If desired, upstream but also downstream of the primary coalescence medium 22, a protective layer 25 may be provided. This protective layer 25 can also serve as a drainage layer, or direct the fluid flow in a desired direction. An example of a suitable material for use as a protective layer 25 is an open polypropylene layer, but other materials can also be used. Preferably, the filter element also includes a core 20. The at least one primary coalescence medium 22 is arranged downstream of the filter core 20.

The coalescence filter 10 preferably includes one or more internal support structures 26, which support integration of the filter element into one mechanical whole, which minimize the risk of mechanical deformation of the filter materials including the coalescence medium 22, under the influence of loading by the fluid, and protect same against the action of unexpected or momentary impact.

The housing 24 may further include a drainage mechanism 32. A suitable drainage mechanism 32 can include automatically, semiautomatically or manually operated valves, via which a coalesced and drained contaminant retained in the housing is removed.

The coalescence filter 10 can further include optional components, which further improve the use and the yield of the filter. Filter head 12 can include, for instance, a status indicator 14, which gives an indication about the status of the coalescence filter, including the potential necessity for a periodic replacement. The status indicator 14 may be provided for directly or indirectly measuring the yield of the coalescence filter and may include an indicator providing indicia of the condition of the coalescence filter 10, by means of, for instance, a visual, auditory or electronic signal or a combination thereof. The indicator 14 may work pneumatically or electrically or according to any principle considered suitable by the skilled person.

The primary coalescence medium 22 used in the coalescence filter of this invention has a porous structure, which can induce aggregation or coalescence of one or more contaminants present in the fluid. The surface of the pores present in the porous structure of the primary coalescence medium may be wetting with respect to one or more of the contaminants to be coalesced, or non-wetting. The surface may be, for instance, oleophobic or hydrophobic, or oleophilic or hydrophilic. In applications where removal of oil from a liquid or gas stream is intended, the coalescence medium can be oleophilic or oleophobic. The material for the primary coalescence medium 22 is preferably so chosen as to have a high affinity for the impurity to be removed.

To make it possible for contaminants of a various nature to be removed in succession, the coalescence filter of this invention can include two or more primary coalescence media 22 of different affinity selective for the contaminant to be removed. Preferably, however, to keep the capillary pressure as low as possible, the coalescence filter includes just one primary coalescence medium.

The primary coalescence medium is a porous material which can include one or more layers of a porous material, and is preferably layered. The primary coalescence medium is preferably made up of one or more layers of a same layer-form fibrous material. In an alternative embodiment, the coalescence filter includes two or more filter elements with different coalescence media, i.e., a plurality of coalescence media of different affinity selective for the contaminant to be removed.

Suitable layer-form materials for use as primary coalescence medium 22 comprise substrates or materials comprised of finite length fibers, continuous filaments and combinations thereof. The primary coalescence medium preferably includes suitable materials which are resistant to the pressure applied to enable displacement of the fluid through the primary coalescence medium, to the liquid contaminants present in the fluid, and to the static and dynamic loads to which the material is exposed during the manufacture of the filter, assembly thereof, and use thereof. Examples of suitable layer-form fibrous materials include woven or nonwoven fibrous materials, knitted materials, plaiting, films, and combinations of these materials or laminates or composites thereof.

The primary coalescence medium is preferably a multi-layered material, which preferably includes at least 4 layers, more preferably at least 6 layers, most preferably at least 10 layers. Mostly, the number of layers of fibrous material will not be higher than 20. The thickness of the individual layers of the coalescence medium is not critical for this invention and may vary within wide limits. The thickness of a layer can be, for instance, a thickness of 0.4 mm, 0.5 mm, 0.6 mm, 0.75 mm or 1 mm. On the other hand, the primary coalescence medium may also be made up of one layer of the desired material, in the desired thickness.

A multi-layered primary coalescence medium can be produced in different ways, for instance, by stacking, pleating, rolling or wrapping a plurality of layers of a fibrous material, so that the desired number of layers is obtained. However, any other method can be suitably used. The layers of the fibrous material are preferably arranged adjacently relative to each other, such that a layer of air of a least possible layer thickness is present between adjacent layers. Preferably, adjacent layers are so arranged that no layer of air is present between them. This can be obtained, for instance, by pressing a plurality of stacked layers together or clamping them, for instance along one or more sides of the fibrous material. Preferably, however, the fibrous material is wrapped, to keep the risk of damage minimal.

Examples of fibrous materials that are particularly suitable for manufacturing a layered material for use in the primary coalescence medium of this invention comprise thermoplastic materials, thermosetting materials, organic or inorganic materials, metallic materials or alloys, admixtures, blends and chemically modified materials, for instance manufactured by drawing, spinning, needling, hydroentanglement, melt spinning (for instance, spin bonding, nanofibers, melt blowing), wet-laying, electro-spinning, solvent spinning, point bonding, adhesive bonding, continuous weave/knit, casting, co-extrusion, etc. Materials of particular preference comprise glass fibers, silicate-based wet-laid thermosetting adhesive bond nonwoven fabrics, for instance, a borosilicate glass fiber of finite length, because of their thermal and hydrothermal resistance to loading by the fluid, the carrier liquid and the contaminant, without the need of chemical modification, for instance by a fluorocarbon surface treatment.

Primary coalescence media suitable for use in this invention have a density which preferably varies between 0.05-0.90 $g/cm^3$, more preferably 0.05-0.75 $g/cm^3$, most preferably 0.08-0.50 $g/cm^3$. Materials having a density of between 0.10-0.25 $g/cm^3$ or 0.12-0.17 $g/cm^3$ can also be suitable and be preferred for well-defined fluids and/or contaminants.

The average diameter of the pores present in the material which the primary coalescence medium is made up of (measured with microscopy) is preferably in the range of 2 to 100 µm, preferably between 3 and 70 µm, more preferably between 5 and 50 µm, most preferably between 5 and 35 µm, in particular between 5 and 30 µm.

Materials for use in the drainage layer 30 can be, for instance, woven or nonwoven materials, knitted materials, films, open cell foams, cast or spun scrims, open meshes and combinations of laminates or composites of the aforementioned materials. Materials for use in the drainage layer 30 may be chosen, for instance, from the group of thermoplastic or thermosetting plastics, organic or inorganic substances, metallic materials or alloys, blends of the aforementioned materials and chemically modified forms thereof. The aforementioned materials can be manufactured in any manner considered suitable by the skilled person, for instance by drawing, spinning, needling, hydroentanglement, melt spinning (for instance, spin bonding, nanofibers, melt blowing), wet-laying, electro-spinning, solvent spinning, point bonding, through-air bonding, adhesive bonding, continuous weave/knit, casting, coextrusion, expansion, solvent cast and the like. Particularly preferred are polyurethane foams, since they are well resistant to thermal loading by the fluid and/or the carrier and contaminant liquid present in the fluid, but at the same time counteract return of the contaminants, for instance hydrocarbon-based contaminants, to the coalescence medium, without the necessity of pretreating one or more parts of the coalescence filter or the drainage layer with fluorine-containing substances.

The primary coalescence medium 22, the drainage layer 30 and the barrier layer can be assembled in the coalescence filter 10 as separate layer-form materials. It is also possible, however, to unite the aforementioned materials in a laminate, so that they form a whole, and optimum contact between adjacent layers is ensured and optimum flow of fluid from one layer to the next can take place.

This invention provides the advantage that the primary coalescence medium is made up of one or more porous layered materials or structures having a high bulk volume and low density, with a large pore volume, the pores having a relatively great average pore diameter. Such an open structure makes it possible to keep low both the capillary pressure and the channel pressure in the transport of the fluid and the coalesced contaminant through the primary coalescence medium and to keep the pressure drop across the coalescence filter low. Capillary pressure is understood to refer to the resistance that a contaminant must overcome to enter a non-wetting coalescence medium, but also the resistance that a contaminant must overcome upon exiting a wetting coalescence medium. Channel pressure is understood to refer to the resistance that a coalesced contaminant must overcome in its displacement through the pore system of the coalescence medium.

Figure 4:
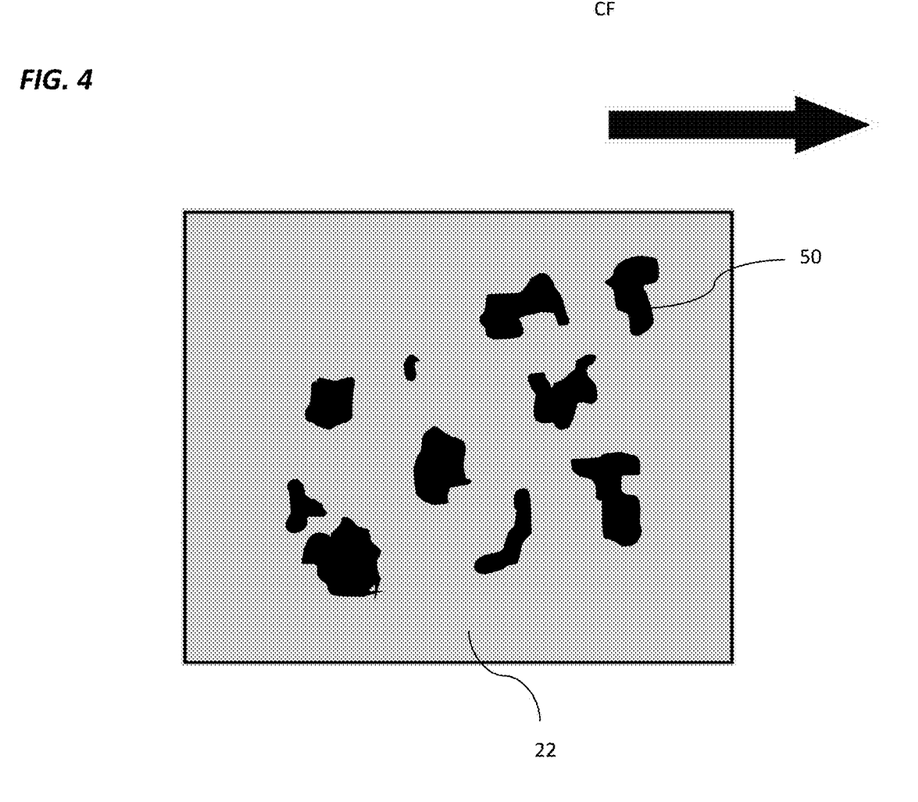
FIG. 4 shows an isometric view of a plurality of quasi-continuous channels formed in the primary coalescence medium, as is shown by regional areas exhibiting a higher concentration of deposited liquid.

The coalesced fractions of the liquid contaminant typically appear in the coalescence medium as quasi-continuous channels with an increased concentration of coalesced liquid. These channels form discrete, perceptible areas which extend through the thickness of the filter material as is shown in FIG. 4. The motive force of the carrier which is forcibly transported through the coalescence filter, for instance by pumping, takes care of the transport of the contaminants through the coalescence medium towards the outlet or the rear, downstream outer surface of the primary coalescence medium, where the contaminants as a liquid fraction have reached a sufficient aggregation to leave the carrier as macroscopic drops under the influence of gravity. It is supposed that the relatively large pores, the low density and high air permeability of the primary coalescence medium of this invention cooperate to enable a dynamic development of quasi-continuous channels during the useful life of the filter and to minimize the pressure drop across the filter.

Figure 3:
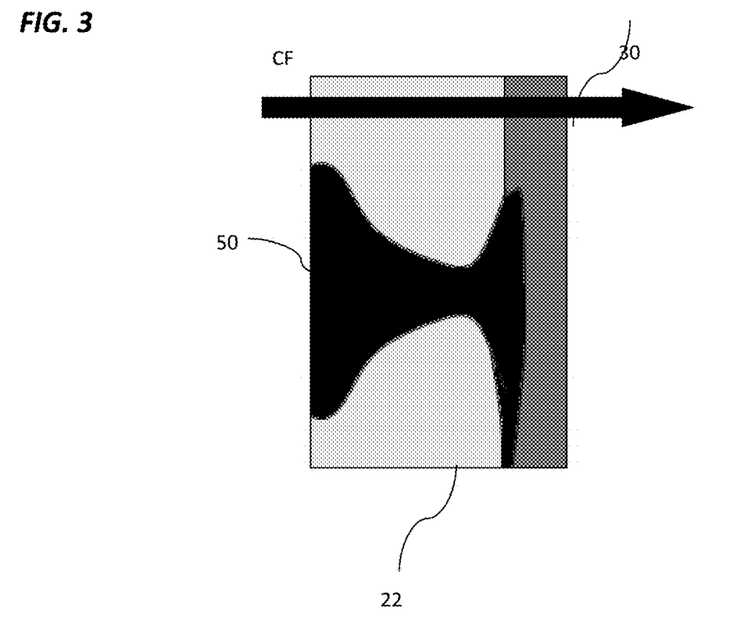
FIG. 3 shows a cross section of a quasi-continuous channel formed in the primary coalescence medium, as is shown by a higher concentration of deposited liquid.

Without wishing to be bound by this theory, it is supposed that it is possible that upon a first contact of a fluid, for instance compressed gas, with the primary coalescence medium 22, a first population of distinct quasi-continuous channels 50 is formed. As additional fluid is supplied, the accessibility of one or more of the quasi-continuous channels 50 may lessen due to the formation of aggregates or immiscible complexes, gelling, and occlusion by solids and/or particles in these channels. Upon continued inflow of fluid, it is possible that a quasi-continuous channel 50 develops in a different direction of the primary coalescence medium 22, along a pathway of lesser resistance. Thus, new quasi-continuous channels may form. Without wishing to be bound by this hypothetical model, it is supposed that upon transport of a compressed flow of, for instance, air containing oil aerosol as contaminant, through a primary coalescence medium, transport proceeds through one or more quasi-continuous channels 50. In these channels 50 an effective reduction of the amount of oil in the air is brought about by coalescing of the oil in these channels 50.

Figure 5:
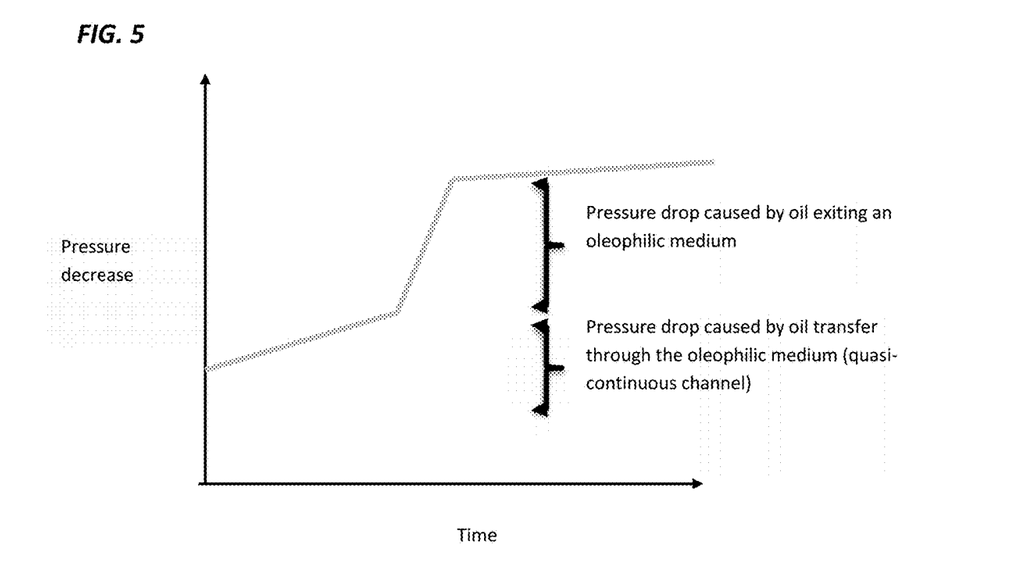
FIG. 5 is a graphic representation of the pressure drop of a carrier fluid through a coalescence medium including wetting (oleophilic) fibers according to this invention, given a carrier fluid flow with deposition of a liquid, oil-containing contaminant, as a function of time.

FIG. 5 shows a practical situation for a coalescence medium made up of an oleophilic fibrous structure. The inventors have established that coalescence of a liquid contaminant from the fluid proceeds according to a stepwise process, with at least a first and second discrete step, each discrete step being associated with a decrease of the pressure across the coalescence medium. A second discrete step was observed when the contaminant leaves the coalescence medium and is associated with an energy barrier which must be overcome upon leaving the coalescence medium for overcoming a force of attraction. A first discrete step was observed upon the movement of the contaminant through the coalescence medium in the form of one or more quasi-continuous channels in that the liquid must be pumped through the coalescence medium.

Figure 6:
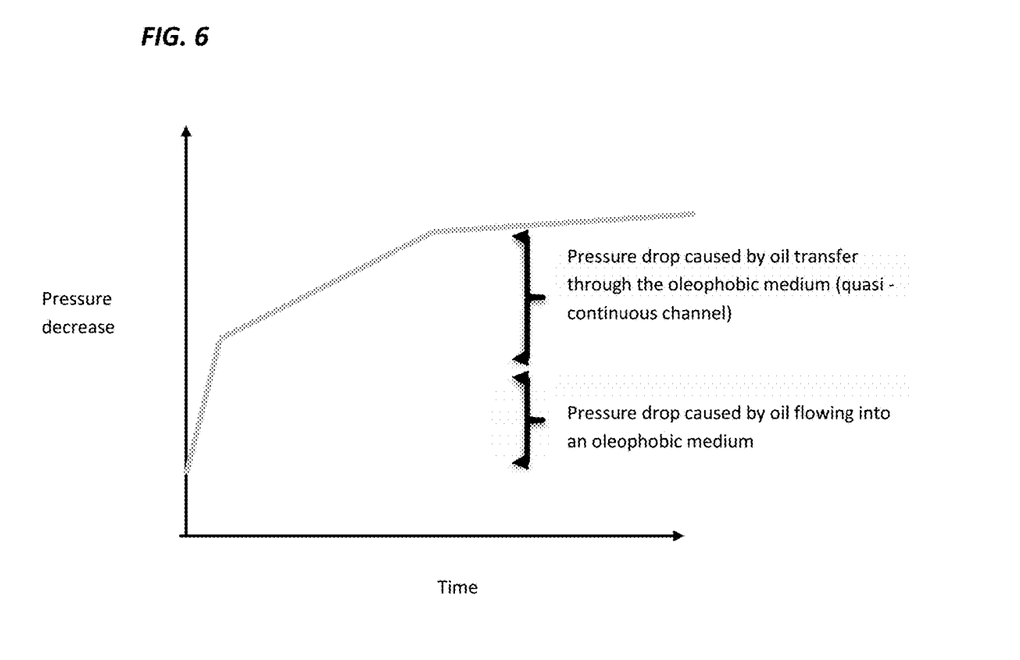
FIG. 6 is a graphic representation of the pressure drop of a carrier fluid through a coalescence medium including oleophobic fibers according to this invention, given a carrier fluid flow with deposition of a liquid contaminant, as a function of time.

FIG. 6 shows a practical situation for a coalescence medium made up of an oleophobic fibrous structure. The inventors have established that coalescence of the liquid contaminant from the fluid is accompanied by a stepwise pressure decrease across the coalescence medium, with at least a first and second discrete step. A first discrete step occurs upon the contaminant flowing into the coalescence medium for overcoming the repulsive force. A second small discrete step occurs upon the transport of the contaminant through the coalescence medium through one or more quasi-continuous channels.

This invention thus provides a coalescence filter with a coalescence medium comprising a plurality of layers of a fibrous material with pores of a relatively great average diameter, through which the fluid with carrier and at least one contaminant move. The fibrous material has a high air permeability, a low density and contains a pore system whose pores have a relatively great diameter. This makes it possible to provide a primary coalescence medium that ensures a higher separation yield of a contaminant present in the fluid. This higher separation yield is accompanied by a considerable reduction of the capillary pressure that is to be overcome by the fluid upon flowing into or exiting from the coalescence medium, but also by a considerable decrease of the channel pressure, that is, the pressure to be overcome in the transport of the fluid and the coalesced contaminant through the pore system of the primary coalescence medium. As the pressure drop across the coalescence medium can be reduced, the energy requirement of the filter system can be improved considerably. This invention thus provides a coalescence filter having an improved separation yield in combination with a reduced energy requirement. This is surprising since in the prior art systems an improved separation yield adversely affects the energy requirement.

With the coalescence filter of this invention, in particular when employed as coalescence filter for a compressed air stream, a separation yield for contaminant liquid present in the air can be obtained of at least 40 μg liquid per $m^3$ carrier fluid or carrier gas per 1.0 mbar pressure difference, preferably at least 44 μg, more preferably at least 46 μg.

The invention is further elucidated in and by the examples below.

The fibrous materials specified below were tested as coalescence filter for purifying oil-contaminated air, as described in ISO 12500-1 and ISO 8573-2. The initial oil concentration was 10 mg/$m^3$.

Comparative Experiments A-B

A filter material was used comprising the specified number of layers of a conventional, commercially available oleophobic filter material with properties as specified in Table 1.

|   | Number of layers | Average pore diameter (μm) | Total thickness coalescence medium | Air permeability (l/$m^2$ · s) | Wet pressure drop (mbar) | Maximum oil transfer (mg/$m^3$) | Efficiency |
|---|---|---|---|---|---|---|---|
| A | 5, flat layers, oleophilic | 4.7 | 4 mm | 43 | 283 | 0.023 | 92 |
| B | 5, flat layers, oleophobic | 8.2 | 2.75 mm | 109 | 133 | 0.12 | 77.5 |

Examples 1-2

A coalescence medium was used comprising 14 and 8 layers, respectively, of oleophilic and oleophobic glass fiber material, respectively, having the material properties as specified below. The permeability to air was determined according to DIN EN ISO 9237.

TABLE 2

| | Number of layers | Average pore diameter (μm) | Total thickness coalescence medium | Air permeability (l/m² · s) | Wet pressure drop (mbar) | Maximum oil transfer (mg/m³) | Efficiency |
|---|---|---|---|---|---|---|---|
| 1 | 14, flat layers, oleophilic | 8.2 | 7.70 mm | 109 | 212 | 0.008 | 98.9 |
| 2 | 8, flat layers, oleophobic | 15.9 | 5.12 mm | 210 | 110 | 0.203 | 79.6 |

From the comparison of Example 1 with Comparative experiment A it appears that the filter efficiency of a thick, open package of filter material is better than that of a thin, closely stacked package. The pressure drop across the thick open package even appears to be lower.

The comparison of Comparative experiment B with Example 2 shows that the filter efficiency is similar for a thick, open package and a thin, densely packed package. However, the pressure drop across the thick open package is lower than the pressure drop across the thin densely packed package.

The invention claimed is:

1. A coalescence filter for purifying a fluid which contains a carrier and at least one liquid contaminant by coalescing of the at least one liquid contaminant, said coalescence filter comprising:
    a housing comprising an inlet and an outlet;
    a primary coalescence medium having a first and second expansive surface area, wherein between said first and second expansive surface area, said primary coalescing medium exhibits a density in the range of between of 0.08 to 0.50 grams per cubic centimeter and air permeability of equal to or greater than 60 liters per square meter second;
    at least one porous drainage layer provided downstream of the primary coalescence medium in a flow direction of the fluid,
    wherein said carrier fluid includes the at least one liquid contaminant at a first concentration;
    wherein said coalescence filter is configured in a way such that said fluid is introduced through the inlet of the housing and flows through the primary coalescence medium from said first expansive surface area of said primary coalescence medium to said second expansive surface area and then through the at least one porous drainage layer, wherein said primary coalescence medium comprises pores forming quasi-continuous channels arranged in a way so that upon passage of the fluid through said primary coalescence medium causes said at least one liquid contaminant to segregate into the quasi-continuous channels, wherein said quasi-continuous channels extend in the flow direction of the fluid and are configured to convey said at least one liquid contaminant under influence of said fluid flow through said primary coalescence medium to the at least one porous drainage layer, and wherein said fluid exhibits a reduced liquid contaminant concentration upon exiting said second expansive surface area of said primary coalescence medium,
    wherein said primary coalescence medium comprises a plurality of stacked or wrapped adjacent layers of a sheet-form porous filter material layer and having at least four successive layers of the same sheet-form porous filter material layer,
    wherein the stacked or wrapped adjacent layers are arranged in a way such that no layer of air is present between adjacent layers so that the pores of successive stacked or wrapped adjacent layers of the sheet-form porous filter material layers at least partly overlap so that pores from a previous layer link up at least partly with pores in the successive layer,
    wherein the pores of the primary coalescence medium have an average diameter between 5 and 100 μm, and
    wherein the primary coalescence medium has a total thickness of at least 3.5 mm measured at a pressure of 2 N/cm².

2. The coalescence filter of claim 1, wherein said density is in the range of 0.10 to 0.25 grams per cubic centimeter.

3. The coalescence filter of claim 2, wherein said density is in the range of 0.12 to 0.17 grams per cubic centimeter.

4. The coalescence filter as in claim 1, wherein said coalescence filter further comprises a performance modifying layer wherein said performance modifying layer having a first and second expansive surface area, and wherein said performance modifying layer maximizes the transfer of said at least one liquid contaminate segregated from the fluid by the primary coalescing media.

5. The coalescence filter as in claim 4, wherein said performance modifying layer further provides a barrier to resist return transfer or re-entrainment of said coalesced contaminate liquid into said fluid flow.

6. The coalescence filter as in claim 4, wherein at least a fraction of said fluid flow is at an incident angle of 1 to 90 degrees to said primary coalescence medium such that at 90 degrees the fluid flow is perpendicular to said first expansive surface area of said primary coalescing media.

7. The coalescence filter as in claim 1, wherein said quasi-continuous channels further comprise a transitional zone.

8. The coalescence filter as in claim 7, wherein said primary coalescing media is comprised of a fibrous component having an oleophilic property and wherein said a transitional zone forms on an exit or trailing aspect of said expansive surface area of said primary coalescing media.

9. The coalescence filter as in claim 1, wherein the pores at least partly overlap so that said pores from a previous layer link up at least partly to form the quasi-continuous channels.

10. The coalescence filter according to claim 1, wherein said primary coalescing media comprises a fibrous component having an oleophobic property.

11. The coalescence filter according to claim 1, wherein the primary coalescence medium comprises fibers having an average diameter between 0.25-20 μm.

12. The coalescence filter according to claim 1, further comprising a second primary coalescence media having a different affinity for the at least one liquid contaminant than the primary coalescence media.

13. The coalescence filter according to claim 1, wherein the air permeability is between 100-2,000 liters per square meter second.

14. The coalescence filter according to claim 1, wherein the primary coalescence medium has a total thickness of at least 7.5 mm measured at a pressure of 2 N/cm$^2$.

15. A method for purifying a fluid which contains a carrier and at least one contaminant, wherein the fluid is conducted through a coalescence filter according to claim 1, for reducing the concentration of the at least one contaminant by coalescing of this contaminant in the coalescence filter.

16. The method according to claim 15, wherein the fluid is chosen from the group of compressed air contaminated with one or more hydrocarbons, contaminated water or contaminated hydrocarbons.

17. The method according to claim 15, wherein the at least one contaminant belongs to the group of liquids, aerosols, macro drops or mixtures of two or more of these materials.

18. The method according to claim 15, wherein at least a fraction of said fluid is supplied to the coalescence medium at an angle of 1 to 90°.

19. A coalescence filter for purifying a fluid which contains a carrier and at least one liquid contaminant by coalescing of the at least one liquid contaminant, said coalescence filter comprising:
  a housing comprising an inlet and an outlet;
  a primary coalescence medium comprising a first and second expansive surface area, wherein between said first and second expansive surface area, said primary coalescing media exhibits a density in the range of between of 0.08 to 0.50 grams per cubic centimeter and air permeability of equal to or greater than 60 liters per square meter second;
  at least one porous drainage layer provided downstream of the primary coalescence medium in a flow direction of the fluid;
  wherein said coalescence filter is adapted to receive the fluid, and said fluid comprises the at least one liquid contaminant at a first concentration;
  wherein said coalescence filter is configured to allow said fluid to be introduced through the inlet of the housing to flow through the primary coalescence medium from said first expansive surface area of said primary coalescence medium to said second expansive surface area and then through the at least one porous drainage layer, wherein said primary coalescence medium comprises pores forming quasi-continuous channels, and said quasi-continuous channels are configured so that upon passage of the fluid through said primary coalescence medium, said at least one liquid contaminant is segregated into the quasi-continuous channels, and wherein said quasi-continuous channels extend in the flow direction of the fluid and are configured to convey said at least one liquid contaminant under influence of said fluid flow through said primary coalescence medium to the at least one porous drainage layer, and wherein said fluid exhibits a reduced liquid contaminant concentration upon exiting said second expansive surface area of said primary coalescence medium,
  wherein said primary coalescence medium comprises a plurality of stacked or wrapped adjacent layers of a sheet-form porous filter material layer and having at least six successive layers of the same sheet-form porous filter material layer,
  wherein the stacked or wrapped adjacent layers are arranged in a way such that no layer of air is present between adjacent layers so that the pores of successive stacked or wrapped adjacent layers of the sheet-form porous filter material layers at least partly overlap so that pores from a previous layer link up at least partly with pores in the successive layer,
  wherein the pores of the primary coalescence medium have an average diameter between 5 and 100 μm, and
  wherein the primary coalescence medium has a total thickness of at least 3.5 mm measured at a pressure of 2 N/cm$^2$.

20. A coalescence filter for purifying a fluid which contains a carrier and at least one liquid contaminant by coalescing of the at least one liquid contaminant, said coalescence filter comprising:
  a housing comprising an inlet and an outlet;
  a primary coalescence medium having a first and second expansive surface area, wherein between said first and second expansive surface area, said primary coalescing medium exhibits a density in the range of between of 0.08 to 0.50 grams per cubic centimeter and air permeability of equal to or greater than 60 liters per square meter second;
  at least one porous drainage layer provided downstream of the primary coalescence medium in a flow direction of the fluid;
  wherein said fluid includes the at least one liquid contaminant at a first concentration;
  wherein said coalescence filter is configured in a way such that said fluid is introduced through the inlet of the housing and flows through the primary coalescence medium from said first expansive surface area of said primary coalescence medium to said second expansive surface area and then through the at least one porous drainage layer, wherein said primary coalescence medium comprises pores forming quasi-continuous channels arranged in a way so that upon passage of the fluid through said primary coalescence medium causes said at least one liquid contaminant to segregate into the quasi-continuous channels, wherein said quasi-continuous channels extend in the flow direction of the fluid and are configured to convey said at least one liquid contaminant under influence of said fluid flow through said primary coalescence medium to the at least one porous drainage layer, and wherein said fluid exhibits a reduced liquid contaminant concentration upon exiting said second expansive surface area of said primary coalescence medium,
  wherein said primary coalescence medium comprises a plurality of stacked or wrapped adjacent layers of a sheet-form porous filter material layer configured to provide a low capillary pressure,
  wherein the stacked or wrapped adjacent layers are arranged in a way such that no layer of air is present between adjacent layers so that the pores of successive stacked or wrapped adjacent layers of the sheet-form porous filter material layers at least partly overlap so that pores from a previous layer link up at least partly with pores in the successive layer,
  wherein the pores of the primary coalescence medium have an average diameter between 5 and 100 μm, wherein the primary coalescence medium has a total thickness of at least 3.5 mm measured at a pressure of 2 N/cm$^2$ wherein said primary coalescence medium is configured to have a separation yield of the at least one liquid contaminant of at least 40 µg liquid per m$^3$ carrier fluid or carrier gas per 1.0 mbar pressure difference for a compressed air system, and wherein the fluid is air, the at least one contaminant is oil, and the first concentration is 10 mg/m$^3$.

* * * * *